US012236688B2

(12) United States Patent
Tokmakov et al.

(10) Patent No.: US 12,236,688 B2
(45) Date of Patent: Feb. 25, 2025

(54) SYSTEMS AND METHODS FOR TRACKING OCCLUDED OBJECTS

(71) Applicants: Toyota Research Institute, Inc., Los Altos, CA (US); The Regents of the University of California, Oakland, CA (US)

(72) Inventors: Pavel Tokmakov, Santa Monica, CA (US); Allan Jabri, Oakland, CA (US); Adrien D. Gaidon, Mountain View, CA (US)

(73) Assignees: Toyota Research Institute, Inc., Los Altos, CA (US); The Regents of the University of California, Oakland, CA (US); Toyota Jidosha Kabushiki Kaisha, Toyota (JP)

( * ) Notice: Subject to any disclaimer, the term of this patent is extended or adjusted under 35 U.S.C. 154(b) by 343 days.

(21) Appl. No.: 17/738,678

(22) Filed: May 6, 2022

(65) Prior Publication Data

US 2023/0237807 A1 Jul. 27, 2023

Related U.S. Application Data

(60) Provisional application No. 63/303,719, filed on Jan. 27, 2022.

(51) Int. Cl.
*G06V 20/58* (2022.01)
*B60W 30/08* (2012.01)
*G06T 7/536* (2017.01)

(52) U.S. Cl.
CPC ............. *G06V 20/58* (2022.01); *B60W 30/08* (2013.01); *G06T 7/536* (2017.01); *B60W 2420/403* (2013.01); *B60W 2554/4049* (2020.02)

(58) Field of Classification Search
CPC ....... G06V 20/58; G06V 10/82; B60W 30/08; B60W 2420/403; B60W 2554/4049;
(Continued)

(56) References Cited

U.S. PATENT DOCUMENTS 7,436,980 B2 10/2008 Sigal et al.
8,538,083 B1 * 9/2013 Medioni ................ G06V 20/52
382/103
(Continued)

FOREIGN PATENT DOCUMENTS

CN 112101176 A 12/2020
CN 112487926 A 3/2021

*Primary Examiner* — Bobbak Safaipour
*Assistant Examiner* — Michael Kim Maiden
(74) *Attorney, Agent, or Firm* — Dinsmore & Shohl LLP

(57) ABSTRACT

A method for tracking occluded objects includes encoding locations of a plurality of objects in an environment, determining a target object, receiving a first end point corresponding to a position of the target object before occlusion behind an occlusion object, distributing a hypothesis between both sides of the occlusion object during occlusion from a subsequent frame of the sequence of frames, receiving a second end point corresponding to a position of the target object after emerging from occlusion from another subsequent frame of the sequence of frames, and determining a trajectory of the target object when occluded by the occlusion object by performing inferences using a spatio-temporal probabilistic graph based on the current frame and the subsequent frames of the sequence of frames. The trajectory of the target object when occluded is used as a learning model for future target objects that are occluded by the occlusion object.

20 Claims, 10 Drawing Sheets

(58) Field of Classification Search
CPC ........... G06T 7/536; G06T 2207/30252; G06T 2207/30241; G06T 2207/20072; G06T 2207/20081; G06T 2207/20084
See application file for complete search history.

(56) References Cited

U.S. PATENT DOCUMENTS

| | | | |
|---|---|---|---|
| 11,200,429 B1* | 12/2021 | Evans | G06V 10/62 |
| 2014/0347475 A1* | 11/2014 | Divakaran | G06V 20/52 |
| | | | 348/135 |
| 2019/0248487 A1 | 8/2019 | Holtz et al. | |
| 2020/0394499 A1 | 12/2020 | Yao et al. | |
| 2022/0036579 A1* | 2/2022 | Liang | G06T 7/246 |

* cited by examiner

SYSTEMS AND METHODS FOR TRACKING OCCLUDED OBJECTS

CROSS REFERENCE TO RELATED APPLICATIONS

This utility patent application claims priority from U.S. Provisional Patent Application Ser. No. 63/303,719 filed Jan. 27, 2022, and entitled "Systems and Methods for Tracking Occluded Objects", the contents of which is included herein by reference.

TECHNICAL FIELD

The present specification generally relates to methods for determining a trajectory of a moving object that is occluded in an environment and, more specifically, to performing inferences using a spatio-temporal probabilistic graph at a training time for determining a trajectory of the object.

BACKGROUND

It is generally known to use tracking algorithms by detection for online multi-object tracking, which alternates between localization and association steps. Such approaches strongly depend on the quality of instantaneous observations and often fail when objects are not fully visible. It is also generally known to use object permanence in the algorithms to track objects. Object permanence relies on the notion that once an object is recognized, we are aware of its physical existence and can approximately localize it even under full occlusions. However, this approach generally estimates a trajectory of the human occluded behind an object and thus does not ignore or break the tracking of the object during the occlusion. As such, conventional algorithms require explicit supervision of the location while invisible or occluded.

Accordingly, a need exists for alternative methods that performing inferences using a spatio-temporal probabilistic graph at a training time to infer such location tracking automatically during training time.

SUMMARY

In one embodiment, a method for tracking occluded objects performed by an object tracking system is provided. The method includes encoding locations of a plurality of objects in an environment captured in a current frame of a sequence of frames, determining a target object of the plurality of objects, receiving a first end point corresponding to a position of the target object before occlusion behind an occlusion object in the current frame, distributing a hypothesis between both sides of the occlusion object during occlusion from a subsequent frame of the sequence of frames, receiving a second end point corresponding to a position of the target object after emerging from the occlusion object from another subsequent frame of the sequence of frames, and determining a trajectory of the target object within a model when occluded by the occlusion object by performing inferences using a spatio-temporal probabilistic graph based on the current frame and the subsequent frames of the sequence of frames. The trajectory of the target object when occluded is used as a learning model for future target objects that are occluded by the occlusion object.

In another embodiment, an object tracking system is provided. The object tracking system includes an image capturing device configured to capture a plurality of objects in an environment in a sequence of frames, one or more processing devices communicatively coupled to the image capturing device, one or more memory modules communicatively coupled to the one or more processing devices, and machine readable instructions stored in the one or more memory modules. The machine readable instructions cause the object tracking system to perform at least the following when executed by the one or more processing devices encode locations of the plurality of objects in the environment captured in a current frame of the sequence of frames, determine a target object of the plurality of objects, receive a first end point corresponding to a position of the target object before occlusion behind an occlusion object in the current frame, distribute a hypothesis between both sides of the occlusion object during occlusion from a subsequent frame of the sequence of frames, receive a second end point corresponding to a position of the target object after emerging from the occlusion object from another subsequent frame of the sequence of frames, and determine a trajectory of the target object within a model when occluded by the occlusion object by performing inferences using a spatio-temporal probabilistic graph at a training time based on the current frame and subsequent frames of the sequence of frames. The trajectory of the target object when occluded is used as a learning model for future target objects that are occluded by the occlusion object.

In yet another embodiment, a vehicle system is provided. The vehicle system includes an image capturing device configured to capture a plurality of objects in an environment in a sequence of frames, one or more processing devices communicatively coupled to the image capturing device, one or more memory modules communicatively coupled to the one or more processing devices, and machine readable instructions stored in the one or more memory modules. The machine readable instructions cause the vehicle system to perform at least the following when executed by the one or more processing devices encode locations of the plurality of objects in the environment captured in a current frame of the sequence of frames, determine a target object of the plurality of objects, receive a first end point corresponding to a position of the target object before occlusion behind an occlusion object in the current frame, distribute a hypothesis between both sides of the occlusion object during occlusion from a subsequent frame of the sequence of frames, receive a second end point corresponding to a position of the target object after emerging from the occlusion object from another subsequent frame of the sequence of frames, and estimate a trajectory of the target object when occluded by the occlusion object by performing inferences using a spatio-temporal probabilistic graph based on the current frame and subsequent frames of the sequence of frames. The trajectory of the target object when occluded is estimated by determining a likely path of the target object in the spatio-temporal probabilistic graph.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to an object tracking system that uses a model to track objects behind an occlusion without making assumptions about the velocity of the object behind the occlusion. By not assuming a constant velocity, the embodiments described herein provide a more robust real-world applications than those in conventional object tracing systems.

An object tracking model is created at a training time by tracking an object that is occluded based on two endpoints for the object passing behind an occlusion. The first endpoint point is the last known position of the object before it is occluded and the second endpoint is the first known position of the object after it is no longer occluded. The model then discovers the most likely hypothesis for connecting the two endpoints by itself. In particular, the model builds a spatio-temporal random graph between the first endpoint and the second endpoint and learns the most likely path of the object behind the occlusion that connects the two endpoints. As such, the model is created during training time to provide supervision. When the model is online, or unsupervised, only the first point is used and the model builds a spatio-temporal random graph to predict or estimate the most likely path of the object behind the occlusion.

The phrase "communicatively coupled" is used herein to describe the interconnectivity of various components of the object tracking system for estimating a trajectory of a target object behind an occlusion object and means that the components are connected either through wires, optical fibers, or wirelessly such that electrical, optical, and/or electromagnetic signals, data, and/or the like, may be exchanged between the components. It should be understood that other means of connecting the various components of the system not specifically described herein are included without departing from the scope of the present disclosure.

Figure 1:
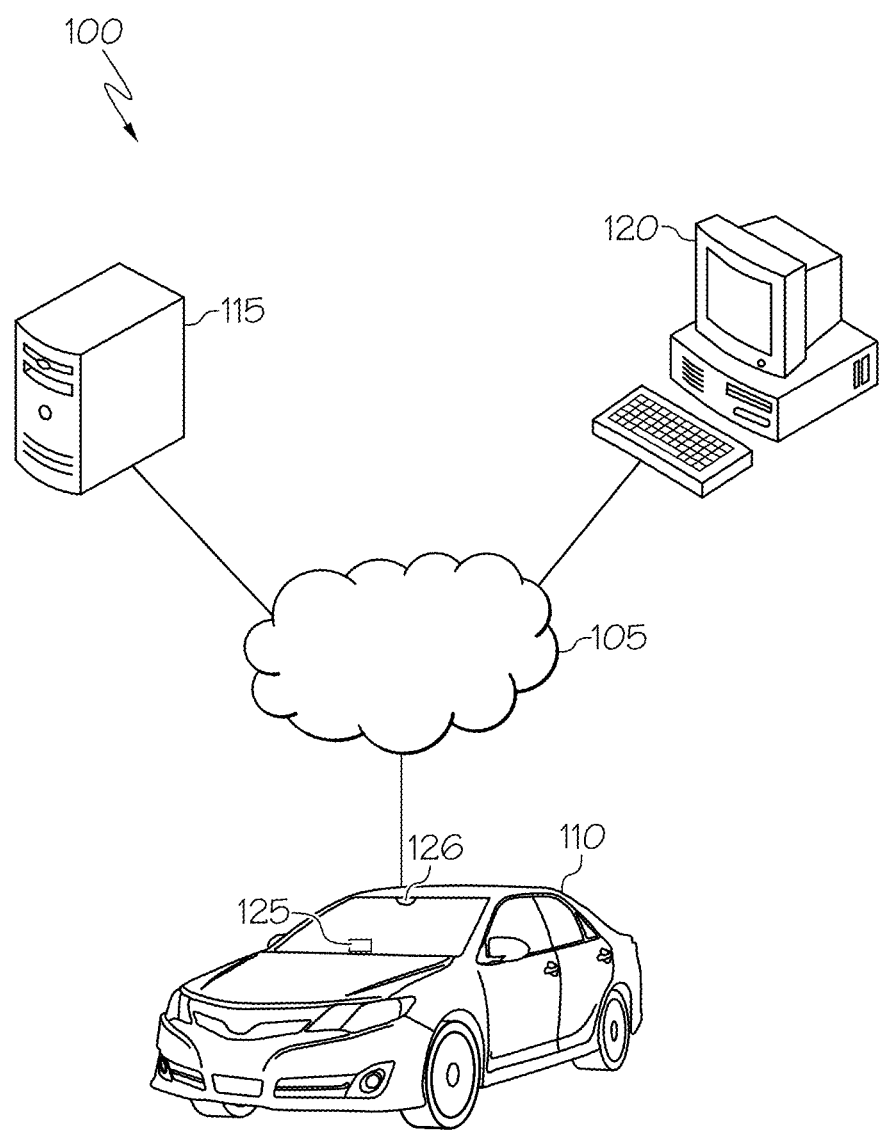
FIG. 1 schematically depicts an illustrative network having components for an object tracking system according to one or more embodiments shown or described herein.

Referring now to the drawings, FIG. 1 depicts an illustrative network having components for an object tracking system 100 according to embodiments shown and described herein. As illustrated in FIG. 1, a computer network 105 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 105 may generally be configured to electronically connect one or more devices such as computing devices and/or components thereof. Illustrative devices may include, but are not limited to, a vehicle 110, a server computing device 115, and a user computing device 120.

The vehicle 110 may generally be any vehicle with the image capturing device 125 and/or one or more sensors 126 communicatively coupled to one or more onboard computing devices, particularly computing devices that contain hardware for processing data, storing data, capturing images in or around the vehicle, and detecting objects such as other vehicles or pedestrians near or around the vehicle 110. Thus, the vehicle 110 and/or components thereof may perform one or more computing functions, such as receiving data, capturing image data (e.g., sequence of frames) with an image capturing device 125 and/or the one or more sensors 126, processing the captured images, storing the processed images, and providing processed images for machine learning algorithms, as described in greater detail herein.

The server computing device 115 may receive data from one or more sources, generate data, store data, index data, search data, and/or provide data to the user computing device 120 and/or the vehicle 110 (or components thereof). In some embodiments, the server computing device 115 may employ one or more machine learning algorithms that are used for the purposes of analyzing data that is received from the vehicle 110, such as a plurality of images, as described in greater detail herein. Moreover, the server computing device 115 may be used to produce data, such as determining a trajectory of a target object when occluded by the occlusion object by performing inferences generating a spatio-temporal probabilistic graph at a training time based on the current frame and the subsequent frames of the sequence of frames, as described in greater detail herein. It should be appreciated that the vehicle on board computing systems may function with the server computing device 115 such that the vehicle on board computing systems may perform the determining a trajectory of a target object when occluded by the occlusion object by performing inferences generating a spatio-temporal probabilistic graph and/or employ the one or more machine learning algorithms.

The user computing device 120 may generally be used as an interface between a user and the other components connected to the computer network 105. Thus, the user computing device 120 may be used to perform one or more user-facing functions, such as receiving one or more inputs from a user or providing information to the user, as described in greater detail herein. Accordingly, the user computing device 120 may include at least a display and/or input hardware, as described in greater detail herein. In the event that the server computing device 115 requires oversight, updating, and/or correction, the user computing device 120 may be configured to provide the desired oversight, updating, and/or correction. The user computing device 120 may also be used to input additional data into a corpus of data stored on the server computing device 115. For example, the user computing device 120 may contain software programming or the like that relates to viewing, interpreting, and/or capturing images and models, as well as software programming that relates to real and synthetic data sets. In a non-limiting example, datasets may include a synthetic, toy LA-CATER, a realistic synthetics PD dataset, and a real-world, multi-object tracking KITTI dataset It should be understood that while the user computing device 120 is depicted as a personal computer and the server computing device 115 is depicted as a server, these are non-limiting examples. In some embodiments, any type of computing device (e.g., mobile computing device, personal computer, server, etc.) may be used for any of these components. Additionally, while each of these computing devices is illustrated in FIG. 1 as a single piece of hardware, this is also merely an example. Each of the user computing device 120 and the server computing device 115 may represent a plurality of computers, servers, databases, components, and/or the like.

Figure 2:
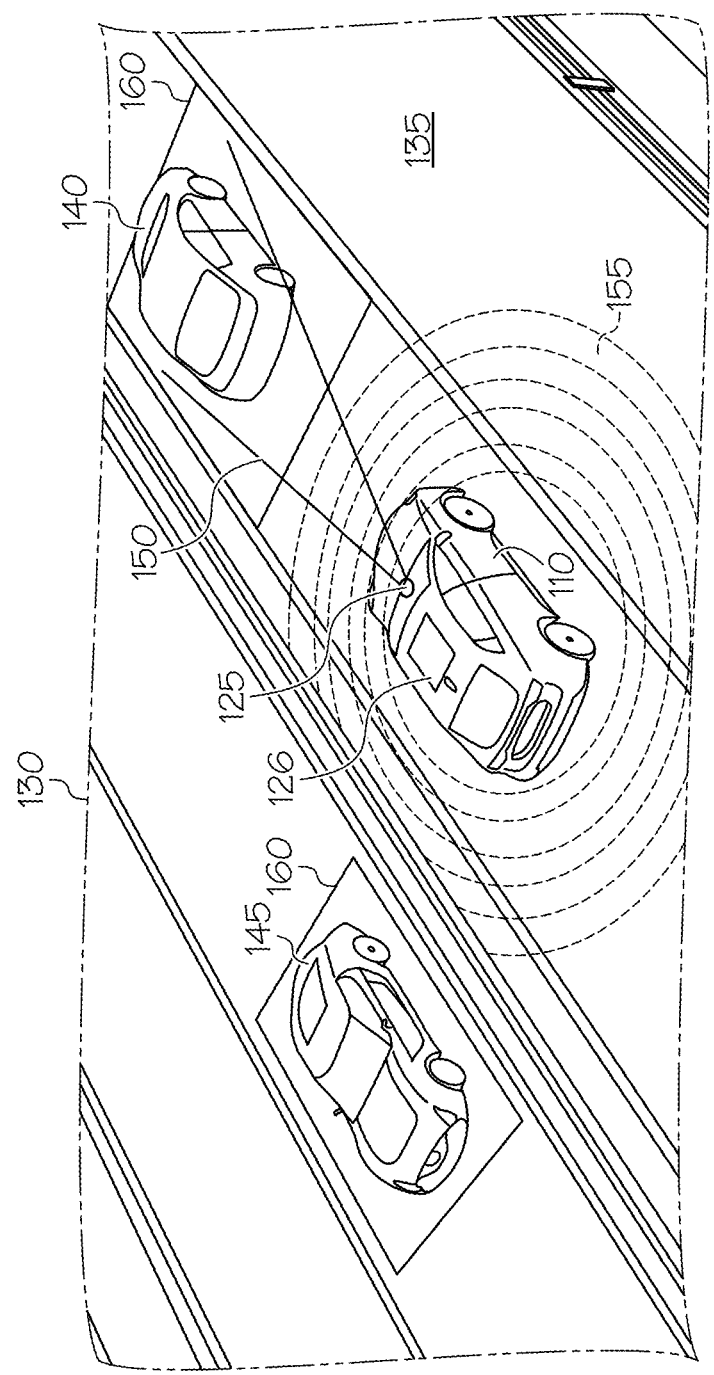
FIG. 2 schematically depicts an example vehicle in an environment according to one or more embodiments shown or described herein.

Now referring to FIG. 2, the vehicle 110 is schematically depicted within an environment 130 according to aspects of the present disclosure. As depicted in FIG. 2, the vehicle 110 is traveling on a road 135. A first vehicle 140 (e.g., other vehicle) may be ahead of the vehicle 110, and a second vehicle 145 may be adjacent to the vehicle 110. In this example, the vehicle 110 may include the image capturing device 125, such as a 2D RGB camera, and/or the one or more sensors 126. The one or more sensors 126 may be another RGB camera or another type of sensor, such as RADAR, LiDAR and/or ultrasound. Further, there may be additional sensors and/or image capturing devices that may be side facing and/or rear facing sensors.

The image capturing device 125 may be any imaging device, sensor, or detector that is suitable for obtaining images. As used herein, the term "images" or "image" refers to video images (i.e., a sequence of consecutive images), still images (including still images isolated from video images), and/or image data. Any suitable commercially available image capturing device 125 may be used without departing from the scope of the present disclosure. In some embodiments, the image capturing device 125 may be coupled to one or more other components that provide additional functionality for imaging, such as, for example, one or more sensors.

The image capturing device 125 may include or may be coupled to a lens (not shown). The lens is not limited by this disclosure and may generally be any optical component that is configured to focus the light entering the image capturing device 125 such that an image can be properly obtained. In some embodiments, the lens may be a fixed lens that is not adjustable. In other embodiments, the lens may be adjustable, either manually or automatically by the one or more processing devices 604, to zoom in on an object, zoom out on an object, and/or adjust the focus of the light entering the image capturing device 125.

In one configuration, the image capturing device 125 captures a 2D image that includes objects in image capturing device 125 field of view 150. The one or more sensors 126 may generate one or more output streams 155 that surround the vehicle 110. In this example, the 2D image captured by the image capturing device 125 includes at least a 2D image of the first vehicle 140, as the first vehicle 140 is in the field of view 150 of the image capturing device 125. As discussed in greater detail herein, bounding boxes 160 may be used around all identified objects within the image such as the first vehicle 140 and the second vehicle 145.

As illustrated in FIG. 2, the environment 130 includes several places where a target object 202 (FIG. 2), such as a pedestrian, may be occluded. For example, an occlusion may occur when the target object 202 (FIG. 2) moves or walks behind another object, such as the first vehicle 140 and the occlusion occurs within the field of view 150 of the image capturing device 125 and/or within the output streams 155 of the one or more sensors 126.

Figure 3:
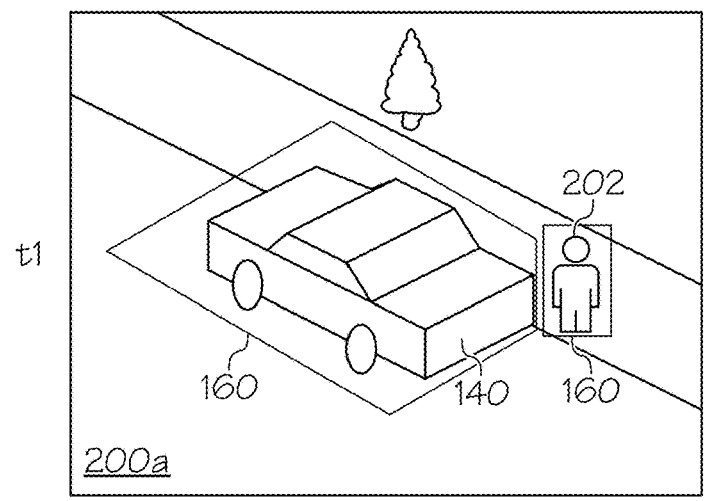
FIG. 3 schematically depicts an example sequence of frames according to one or more embodiments shown or described herein.
Figure 3:
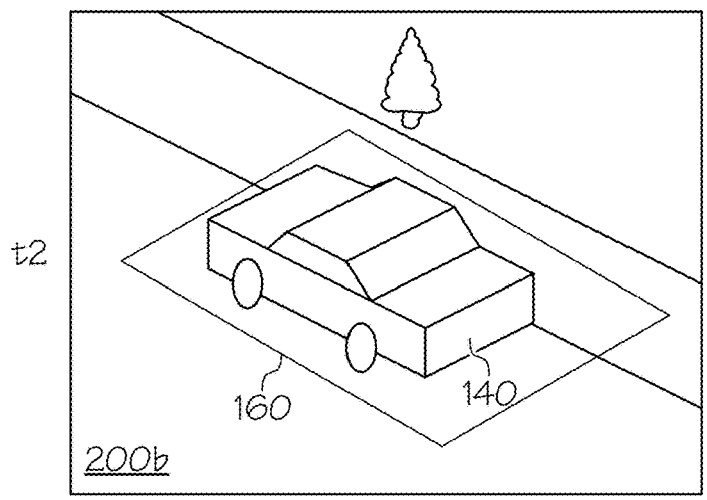
Figure 3:
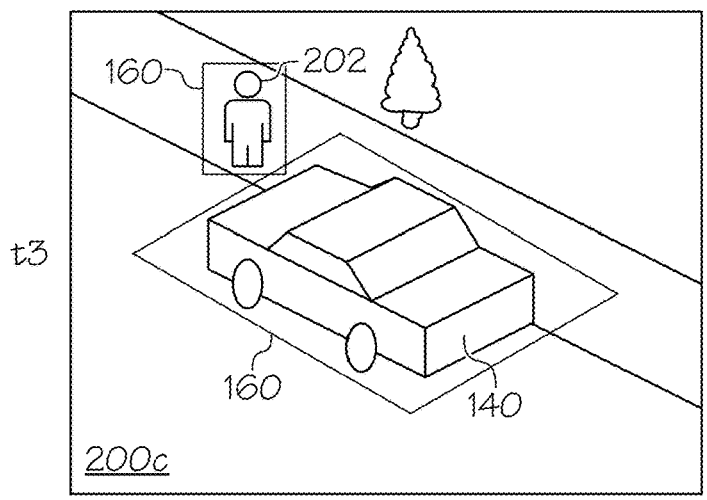

Now referring to FIG. 3, the target object 202 is illustrated in an example sequence of frames. In the example at time t1, at a first frame 200a of the sequence of frames, the target object 202 is visible to the right of the first vehicle 140. At time t2, the target object 202 is no longer visible and is now occluded in a second frame 200b of the sequence of frames because the target object 202 has walked behind the first vehicle 140. At time t3, the target object 202 is visible in a third frame 200c of the sequence of frames. While a human observer may determine that the target object 202 is still present in the environment 130 and has not disappeared, a conventional object tracker may fail to determine that the target object 202 is still present in the environment 130 when the target object 202 is occluded by the first vehicle 140. Object trackers are not limited to tracking people, such as the target object 202, as other types of objects, such as vehicles, animals, or any other object may be tracked.

The frames 200a, 200b, 200c may be captured via the one or more sensors of the vehicle 110, such as the image capturing device 125 and/or the one or more sensors 126, as described with reference to FIG. 2. In other examples, the frames 200a, 200b, 200c may be synthetically generated and provided to an object tracking model 300 (e.g., object tracking neural network). As illustrated in FIG. 3, the frames 200a, 200b, 200c may be sequential in time.

Figure 4:
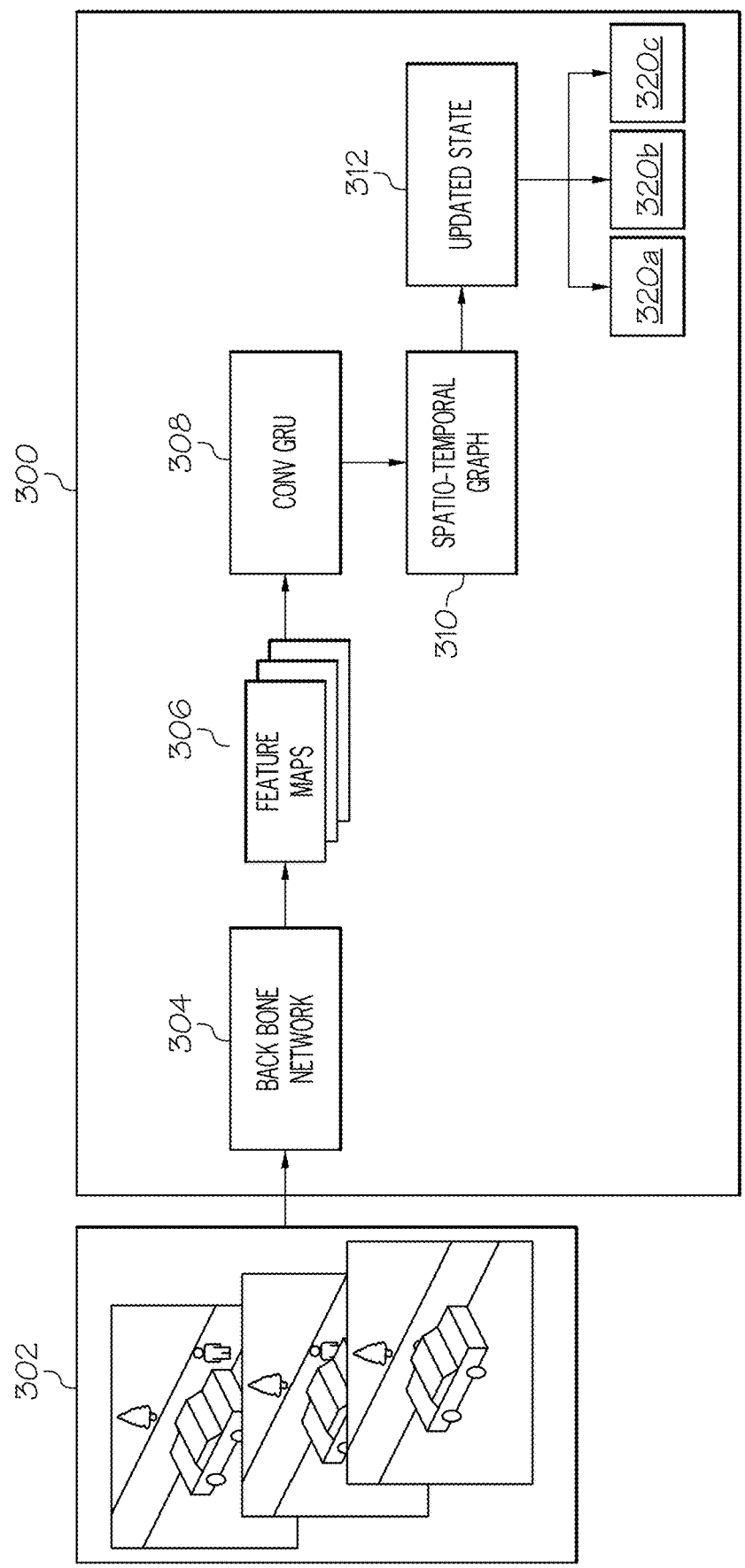
FIG. 4 schematically depicts a block diagram illustrating an example object tracking model according to one or more embodiments shown or described herein.

Now referring to FIGS. 3-4, as discussed in greater detail herein, training the training model to estimate a location and a trajectory of the target object 202 at each moment in time during the occlusion first determines a first end point before the occlusion and a second end point after the occlusion and generates a spatio-temporal probabilistic graph based on the current frame and the subsequent frames of the sequence of frames to estimate a location of the target object 202 at each moment in time after the target object 202 is occluded by the first vehicle 140.

In online operations, a trained object tracking model 300 may estimate a location and a trajectory of the target object 202 at each moment in time during the occlusion. The trained object tracking model 300 may determine a first end point before the occlusion to generate a spatio-temporal probabilistic graph based on the current frame and the subsequent frames of the sequence of frames to estimate a location of the target object 202 at each moment in time after the target object 202 is occluded by the first vehicle 140. That is, the spatio-temporal probabilistic graph is generated in real time or on-the-fly by the trained model 300 such that a second end point after the occlusion is no longer needed to generate the graph. The trained object tracking model 300 may also determine a trajectory of movement of the target object 202 during the occlusion using the concept of object permanence—that the target object 202 still exists even when occluded.

Conventional multi-object tracking systems and video systems use an existing object detector to localize objects of interest in each frame of a sequence of frames, and then link the localized objects into tracks, in an online or offline manner. For ease of explanation, in the current disclosure, a multi-object tracking system or model may be referred to as an object tracking system 100 generating an object tracking model 300. In some cases, conventional object tracking systems link a detected object to an existing trajectory based on bounding box overlap, learned appearance embedding, human pose, or graph-convolutional based trajectory representations. The conventional object tracking systems may be limited due to their frame-based nature. Such conventional object tracking systems resort to heuristic-based algorithms to handle occlusions. Further, conventional multi-object tracking systems and video systems use a spatial recurrent network to accumulate a representation of the scene and localize instances—both visible and invisible—using this representation.

Aspects of the present disclosure are directed to a self-supervised objective that encourages object permanence to naturally emerge from data by generating a random walk to model space-time correspondence as a spatio-temporal graph of patches (i.e. from a video). As such, instead of supervising the target object 202 at each step, which is disclosed in conventional systems and requires temporally dense annotation, the self-supervised objective herein supervise every k steps, providing implicit supervision for the trajectory taken by the target object 202. As such, the aspects described herein use object permanence by optimizing along an evolving spatial memory, provided that the states in each time step are features produced by a recurrent encoder to overcome partial observability.

Further, aspects of the present disclosure are directed to an online setting, where the object tracking model 300 associates the target object 202 detected in a current frame with one of the previously established trajectories for the detected object. In one configuration, an end-to-end trainable object tracking model 300 is specified to localize objects behind occlusions. In some aspects, the object tracking model 300 utilizes a center-tracking model to a sequence of frames as an input, and predicts object centers together with their displacement vectors. The displacement vectors may be used to link object detections into tracks.

As discussed in greater detail herein, aspects of the present embodiments may operate on sequences of frames (e.g., videos) having an arbitrary length. In one configuration, each frame may be processed by a center-tracking model configured to extract features from the frame. The resulting features may be provided to a convolutional gated recurrent unit (ConvGRU) 308 (FIG. 4) to aggregate a spatio-temporal representation of the scene. The ConvGRU 308 (FIG. 4) is an example of an extension of a conventional gated recurrent unit (GRU). In such an example, the fully connected layer of the GRU is replaced by a convolutional layer, such that the ConvGRU 308 (FIG. 4) has the time sequence modeling capability of the GRU. Additionally, similar to a convolutional neural network (CNN), the ConvGRU 308 (FIG. 4) may describe local features.

Figure 6A:
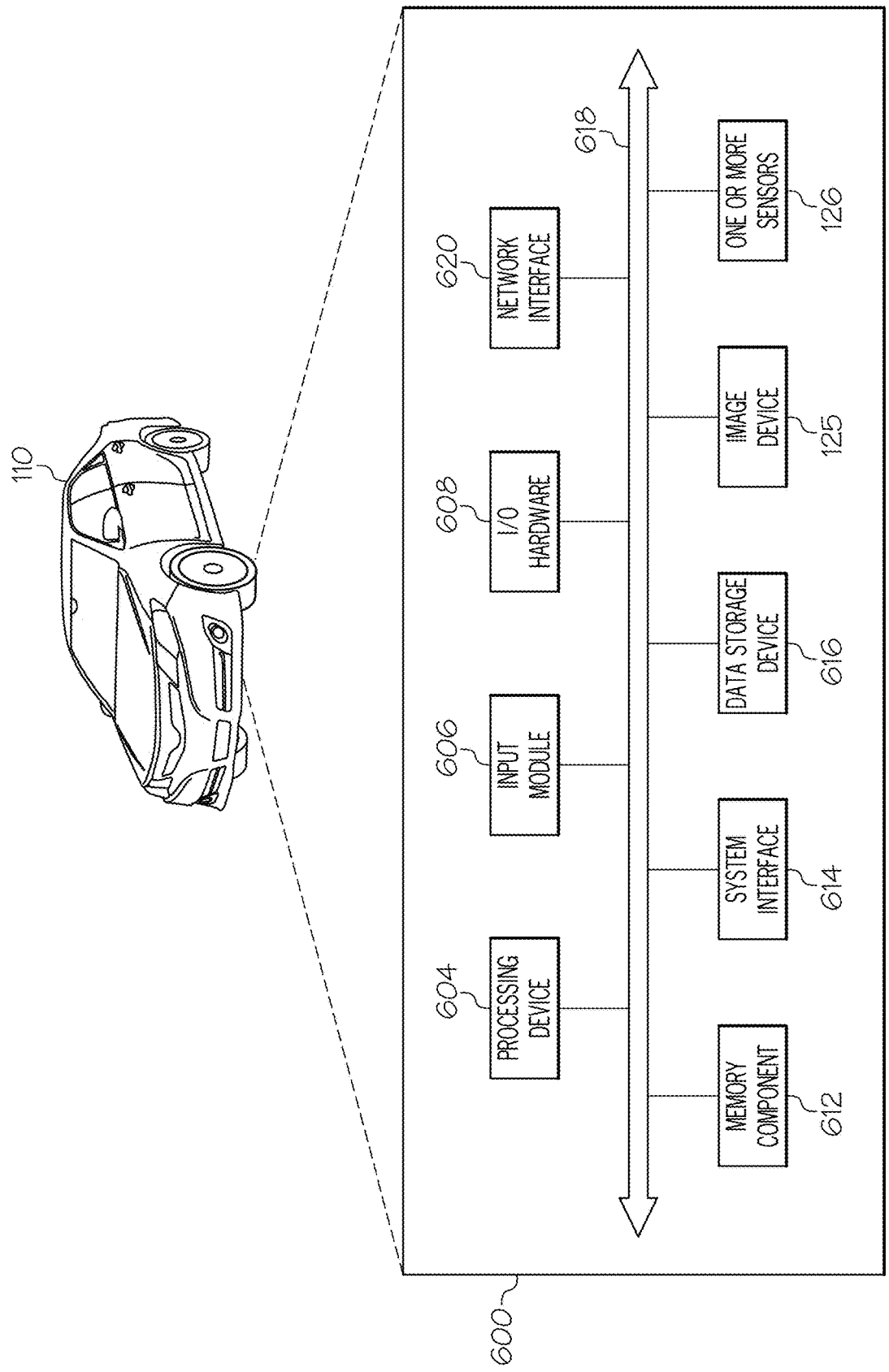
FIG. 6A schematically depicts illustrative hardware components of an electronic control unit that may be used in the object tracking system according to one or more embodiments shown and described herein.

The ConvGRU 308 may generate a current state for a current frame t, which may be stored in a memory module such as the memory component 612 (FIG. 6A). In some implementations, object centers and corresponding displacement vectors may be determined based on the current state of the frame t. In one configuration, the object tracking model 300 may use a full context of a video from an initial frame (e.g., frame 1) to a current frame t {1, . . . , t}, in contrast to conventional object tracking systems that are limited to a previous frame t−1 and a current frame t {t−1, t}. As such, the object tracking model 300 of the current disclosure may be more robust in comparison to conventional object tracking systems. Additionally, the object tracking model 300 of the present embodiments may learn to localize and associate objects that are not visible in the current frame.

As described herein, aspects of the present disclosure implement a center-tracking model. In one configuration, the center-tracking model generates a representation of each object (e.g., each object of interest) by a single point at a center of a bounding box 160 of the objects visible in the environment 130 (e.g., the bounding boxes 160 depicted in FIGS. 2-3). This center point may be tracked through time. That is, the center-tracking model may localize object centers.

Now referring to FIG. 4, the example trained object tracking model 300 is schematically depicted. As illustrated in FIG. 4, the object tracking model 300 receives, as an input, a sequence of frames 302 $\{I^1, I^2, \ldots, I^n\}$, such as the sequence of frames 200a, 200b, 200c described with reference to FIG. 2 above. The sequence of frames 302 may be consecutively provided to backbone network 304 to obtain feature maps 306 $\{F^1, F^2, \ldots, F^n\}$ for the sequence of frames, such as down-sampled feature maps. That is, each frame of the sequence of frames 302 is individually passed through the backbone network 304 in a consecutive manner to obtain a different feature maps 306 for each respective frame of the sequence of frames 302. Each of the feature maps 306 encodes locations of visible objects in a corresponding frame. The feature maps 306 may be an example of a feature map generated from a convolutional neural network. The backbone network 304 may be modeled based on the conventional center-tracking model described above and/or based on object permanence.

Aspects of the present disclosure process sequences of feature maps and aggregate a representation of the scene, which encodes the locations of all the previously seen objects, even if they become fully occluded. In one configuration, the object tracking model 300 includes a convolutional gated recurrent unit (ConvGRU) 308, which may be a type of a recurrent memory network. The ConvGRU 308 may be an extension of a gated recurrent unit (GRU). That is, the ConvGRU 308 may replace a 1D state vector of the GRU with a 2D state feature map M. In some examples, the 2D feature map represents spatial information (e.g., height and width). The ConvGRU 308 may replace fully connected layers of the GRU, used to compute state updates, with 2D convolutions. As a result, the ConvGRU 308 may capture temporal and spatio-temporal patterns in the inputs. That is, the ConvGRU 308 aggregates information over the sequence of frames.

The ConvGRU 308, as a spatial recurrent neural network, depicted by Equation 1:

$$M^t = \text{ConvGRU}(F^t, M^{t-1}) \quad (1)$$

where $M^t, M^{t+1} \in \mathbb{R}^{D \times H' \times W'}$ represent the current and previous spatial memory states, respectively. The state $M^t$ is informed by prior context of extant objects when integrating updates $F^t$ from the current frame, and can encode the locations of both visible and invisible objects.

In the example of FIG. 4, at each time step t, a corresponding feature map 306 may be passed to the ConvGRU 308 to determine an updated position of the target object 202 (FIG. 3). For total occlusion, the self-supervised framework for learning to localize the target object 202 (FIG. 3) which is invisible, is based on a contrastive random walk along the memory state and learns to estimate the locations of occluded object centers without any explicit supervision.

Figure 5A:
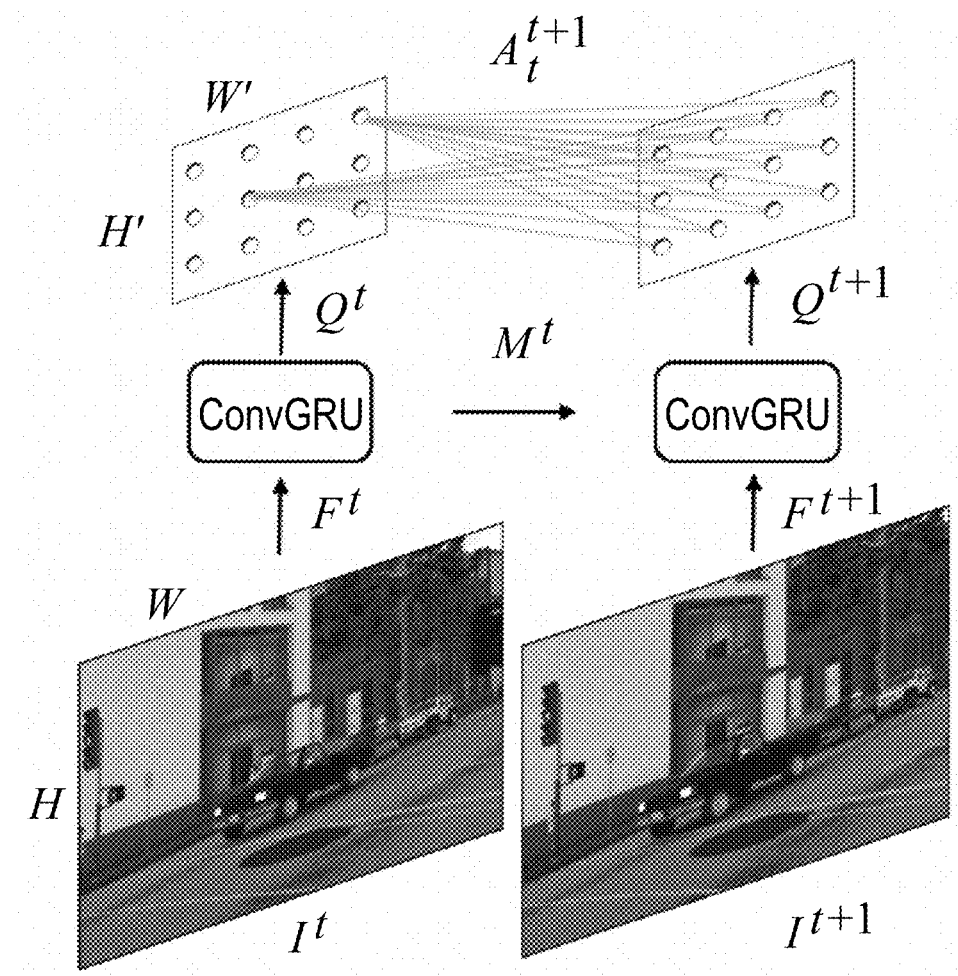
FIG. 5A schematically depicts a graphically representation of construction of a spatio-temporal graph over an evolving spatial memory according to one or more embodiments shown and described herein.
Figure 5B:
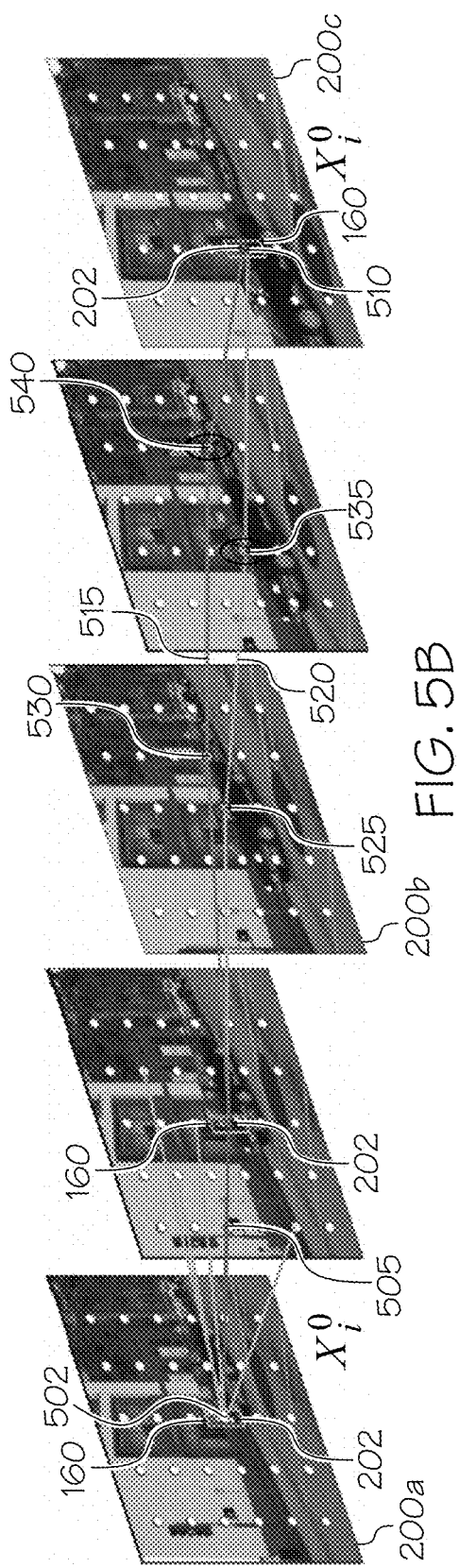
FIG. 5B schematically depicts a graphically representation of a contrastive random walk along memory with a plurality of paths leading to a target object overlaid on the frames of a video from the synthetic PD dataset according to one or more embodiments shown and described herein.

Still referring to FIG. 4 and now also to FIGS. 5A-5B, in which FIG. 5A schematically depicts construction the spatio-temporal graph over an evolving spatial memory and FIG. 5B schematically depicts a contrastive random walk along memory with a plurality of paths leading to a target object overlaid on the frames of a video from the synthetic PD dataset. As illustrated in FIG. 5A, the spatio-temporal graph is constructed over an evolving spatial memory. To overcome partial observability, states $Q^t$ are computed with a sequence encoder, allowing for transition probability $A_t^{t+1}$ to model permanent object properties. It should be appreciated that only a subset of the edges is shown for readability.

The data from the ConvGRU 308, such as the 2D feature map 306 that represents spatial information, may be input into the spatio-temporal graph 310 to estimate the locations of occluded object centers for learning object permanence without any explicit supervision and estimate the most likely trajectory of the target object 202 (FIG. 3) during the occlusion. The spatio-temporal graph extends over the memory state $M^t$ with pixels as nodes $Q^t = f_q(M^t) = \{q^t_1, q^t_2, \ldots, q^t_m\}$, and only nodes in consecutive frames $Q^t, Q^{t+1}$ sharing an edge. The strength of an edge is determined by the similarity of the node embedding d $(q^t_i, q^{t+1}_j) = <q^t_i, q^{t+1}_j>$, which is converted to into non-negative affinities by applying a softmax over edges originating from each node depicted in Equation 2:

$$A^{t+1}(i, j) = \frac{\text{softmax } (Qt, Q^{t+1})ij}{\exp(d(qt, q^{t+1}/\tau))} \quad (2)$$
$$= N_{t=1} \exp(d(q^t, q^{t+1}/\tau))$$

where $\tau$ is the temperature parameter. In contrast to conventional systems, in the aspects described herein, the spatio-temporal graph 310 is built over the evolving memory $M^t$, not over independently encoded features. As such, the nodes may represent invisible objects and the transition probability is not solely determined by similarity of instantaneous appearance.

For each training sequence, the model sees a set of objects annotations $\{O_1, O_2, \ldots, O_N\}$ as input, where an object is represented with a list of visible bounding box centers $O_i = \{p^0_i, p^1_i, \emptyset, \emptyset, \ldots, p^t_i, \ldots, p^T_i\}$, and empty annotations $\emptyset$ correspond to frames in which the object is occluded. For each object $O_i$ we initiate a random walk originating from the first visible object center $p^0_i$ (shown extending from a starting node 502 in the first frame 200a in FIG. 5B, without loss of generality the object is visible in the first frame 200a of the sequence). In particular, we initialize the walker state matrix $X^0_i$ with 1 at $p^0_i$ and 0 everywhere else, and compute the distribution of the object location at time t depicted in Equation 3:

$$X^t_i = X^0_i \Pi_{j=1}^{t-1} A_j^{j+1} = P(X^t_i, X^0_i) \quad (3)$$

where $P(X^t_i = p(X^0_i))$ represents the probability that object i is at position p, at time t, given its position $p^0_i$ at time 0. The ground truth boxes of visible objects supervise the target object 202 depicted in Equation 4:

$$L_{CE(X^t_i, p^t_i)} = -\log P(X^t_i = p^t_i | X^0_i) \quad (4)$$

where $L_{CE}$ is the cross entropy loss, and the total loss for the object $O_i$ is defined as Equation 5:

$$L_{RAM}(O_1) = \Sigma_{t=1}^T 1(p_i^t) L_{CE}(X^t_i, p^t_i) \quad (5)$$

where $1(p_i^t)$ is the indicator function which is equal to 1 for non-empty object center labels $p_i^t$ and is 0 otherwise. The overall objective is averaged over all the objects in the scene depicted in Equation 6:

$$L_{RAM} = \frac{1}{N} \sum_{i=1}^{N} L_{RAM} O_i \quad (6)$$

As such, the object centers are supervised in frames in which the target object 202 is visible. In cases of occlusion, there are many potential paths through the graph that link the object's locations before ($P^{t-1}$) and after ($P^{t+k}$) occlusion. By minimizing the RAM objective in Equation 5, the probabilities are shifted towards the paths which are most likely to result in correctly localizing the target object 202 when it re-appears without enforcing any single hypothesis. The locations of invisible objects are implicitly supervised without the need for any labels and with minimal assumptions about dynamics. In particular, the encoder learns to store the spatially-grounded object-centric information in memory Mt in such a way, as to guide the edge weights in Equation 2 towards the most likely object paths.

In such an example, the updated state 312 is determined by a GRU function based on a previous state $M^{t-1}$, the spatio-temporal graph 310 and the feature maps 306. For an initial frame, the previous state $M^{t-1}$ may be initialized to a particular value, such as zero. The updated state 312 may be an example of an output feature map 306. In the example of FIG. 4, the explicit encoding of the objects in the previous frame $H^{t-1}$ is not used because the explicit encoding is captured in the ConvGRU 308. Additionally, in the example of FIG. 4, the updated state 312 may be processed by distinct sub-networks 320a, 320b, and 330c to produce predictions for the current frame. The predictions are based on the updated state 312, which is based on the features of the current frame $I^t$ and the previous frames ($I^{t-1}$ to $I^1$).

Each sub-network 320a, 320b, 320c may be a convolutional neural network trained to perform a specific task, such as determine object centers based on features of the updated state 312, determine bounding box 160 dimensions based on features of the updated state 312, and determine displacement vectors of the updated state 312. As such, the object tracking model 300 may be trained using a frame-level loss function in an end-to-end fashion with back propagation.

The conventional center-tracking models establish correspondences between objects in a pair of frames $\{I^{t-1}, I^t\}$ based on raw pixel values. Aspects of the present disclosure improve object tracking by establishing correspondences between objects over a sequence of frames based on feature representations. Further, aspects of the present disclosure build spatio-temporal graphs from the sequence of memory states, where nodes correspond to potential object locations, as illustrated in FIG. 5A.

As illustrated in FIG. 5B, the random walker state overlaid on the frames of a video from the synthetic PD dataset. It should be understood that only a subset of the edges is illustrated for readability. To localize occluded objects, a random walk on the graph is initiated that originates from a visible object center illustrated by line 505 extending from the first frame 200a. While the target object 202, depicted as a pedestrian walker, is visible, the pedestrian walker state is supervised directly. During occlusions, the target object 202 is free to take any path in the graph as long as it terminates at the object center at the time of disocclusion illustrated with node 510 in the last frame. Multiple hypothesis about the object location, illustrated as lines 515 and 520 are implicitly supervised and pass through nodes 525 and 530 in one frame and 535 and 540 in the next consecutive frame for illustrative purposes.

As such, the nodes are image patches and edges are affinities (in some feature space) between nodes of neighboring frames. It should be understood that features are learned such that temporal correspondences are represented by strong edges. Paths through the graph are determined by performing a random walk between query and target nodes. A contrastive loss encourages paths that reach the target, implicitly supervising latent correspondence along the path. As such a palindrome sequence is not necessary since the model uses a ground truth starting and end points in occlusion episodes.

Therefore, the object tracking model 300 may predict the presence of an occluded object, such as the target object 202 (FIG. 3) at a location based on stored information regarding one or more of the object's previous locations, velocity, or trajectory. That is, object information, such as the target object 202 (FIG. 3) location, velocity, and/or trajectory, may be aggregated over the previous frames to predict an object's location at a current frame regardless of whether the object is visible in the current frame.

Still referring to FIGS. 4 and 5A-5B, the space-time graph is formed by extracting nodes from each frame and allowing directed edges between nodes in neighboring frames. The transition probabilities of a random walk along this graph are determined by pairwise similarity in a learned representation. Given the spatio-temporal connectivity of the graph, a step of a random walker on the graph may be viewed as performing tracking by contrasting similarity of neighboring nodes (using encoder $\varphi$). That is, when $X_t$ is the state of the walker at time t, with transition probabilities $A^{t+1}(i,j) = P(X_{t+1}=j \mid X_t=i)$, where $P(X_t=i)$ is the probability of being at node i at time t. With this view, formulate long range correspondence as walking multiple steps along the graph.

In some implementations, a location of an object occluded in the current frame may be predicted based on a comparison of object centers decoded from the representation of the current state to object centers saved for each prior representation corresponding to each different respective prior frame. In such implementations, the location of each object center for each visible object in the current frame may be compared with the stored location of each object center for each respective prior representation. The location of an object center may be matched to the closest object center to recover a track (e.g., path) for a corresponding object. Additionally, an object center of a prior representation that is not visible in the current frame may be identified by performing a random walk on the spatio-temporal problisitic graph originating at the last visible object location and taking the Argmax (e.g., operational argument that gives the maximum value from a target function) of the spatio-temporal problisitic graph state at each consecutive frame (time step) as the predicted location which is stored as object center locations.

It should be appreciated that the object tracking model 300 may then determine that an object corresponding to the identified object center is occluded in the current frame. Furthermore, the object tracking model 300 (e.g., object tracking system 100) may predict the location of the object occluded in the current frame based on a stored location of the identified object center and a velocity predicted based on a stored displacement vector of the object corresponding to the identified object center. As described, the displacement vector identifies a displacement of the object from current frame to a prior frame. That is, the object tracking model 300 identifies a location of the occluded object by using an object's previously observed velocity, the object's last observed location, and a speed of the image capturing device 125 and/or the one or more sensors 126. In some examples, if a person walks behind a parked car the model can predict the person's location by propagating it with the last observed velocity of the person and accounting for the change of the relative position of the occluded with respect to the vehicle. In some other examples, after training, the model may predict the location based on training. An accuracy of the predicted velocity may increase as a number of frames in which the object is visible increases.

In some implementations, a supervised learning method may be used to train the object-tracking model. Training and evaluation on sequences that are longer than two frames may further improve the object-tracking model due to the increased robustness of a video representation, aggregated over multiple frames.

Generating a large dataset in the controlled environment with objects of interest equipped with tracking devices may be cost-prohibitive. In one configuration, the new dataset is generated with synthetic data. The synthetic data (e.g., synthetic videos) may provide annotations for all the objects, irrespective of their visibility, at no additional cost.

As such, aspects of the present disclosure are that during occlusions, the walk with ground truth object locations before and after the occlusion, as best illustrated in FIG. 5B, permit for multiple hypotheses of the object trajectory during occlusions, which are implicitly supervised in the framework described in greater detail herein. By optimizing for space-time correspondence on the random graph, a visual representation is learned that stores permanent object-centric information in a spatially-grounded manner.

Now referring to FIG. 6A, illustrative hardware components of the vehicle 110 that may be used in data creation for machine learning is schematically depicted. While the components depicted in FIG. 6A are described with respect to the vehicle 110, it should be understood that similar components may also be used for the user computing device 120 (FIG. 1) and/or the server computing device 115 (FIG. 1) without departing from the scope of the present disclosure.

The vehicle 110 may include a vehicle component 600 having a non-transitory computer-readable medium for completing the various processes described herein, embodied as hardware, software, and/or firmware, according to embodiments shown and described herein. As such, the vehicle component 600 may be an electronic control unit. While in some embodiments the vehicle component 600 may be configured as a general purpose computer with the requisite hardware, software, and/or firmware, in other embodiments, the vehicle component 600 may also be configured as a special purpose computer designed specifically for performing the functionality described herein. For example, the vehicle component 600 may be a device that is particularly adapted to utilize machine learning algorithms for the purposes of tracking occluded objects. In another example, the vehicle component 600 may be a device that is particularly adapted to utilize machine learning algorithms for the purposes of improving functionality of the object tracking system 100 by determining or estimating a trajectory of a target object while occluded. Other uses of machine learning in vehicles should be understood. In embodiments where the vehicle component 600 is a general purpose computer, the systems and methods described herein provide a mechanism for improving functionality by determining and/or estimating a trajectory of a target object during occlusion such that machine learning processes may know the exact movement and trajectory of moving objects wo may not be at a constant velocity or heading when occluded, can be determined. As such, human annotation is no longer required and there is no longer a need to make assumptions regarding object dynamically.

Still referring to FIG. 6A, the vehicle component 600 may generally be an onboard vehicle computing system. In some embodiments, the vehicle component 600 may be a plurality of vehicle computing systems.

As also illustrated in FIG. 6A, the vehicle component 600 may include one or more processing devices 604, an input module 606, an I/O hardware 608, a network interface hardware 620, a non-transitory memory component 612, a system interface 614, a data storage device 616, the image capturing device 125 and the one or more sensors 126. A local interface 618, such as a bus or the like, may interconnect the various components.

The one or more processing devices 604, such as a computer processing unit (CPU), may be the central processing unit of the vehicle component 600, performing calculations and logic operations to execute a program. The one or more processing devices 604, alone or in conjunction with the other components, is an illustrative processing device, computing device, processor, or combination thereof. The one or more processing devices 604 may include any processing component configured to receive and execute instructions (such as from the data storage device 616 and/or the memory component 612).

The memory component 612 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 612 may include one or more programming instructions thereon that, when executed by the one or more processing devices 604, cause the one or more processing devices 604 to complete various processes, such as the processes described herein with respect to FIGS. 7-8. Still referring to FIG. 6A, the programming instructions stored on the memory component 612 may be embodied as a plurality of software logic modules, where each logic module provides programming instructions for completing one or more tasks, as described in greater detail below with respect to FIG. 6B.

The input module 606 may include tactile input hardware (i.e. a joystick, a knob, a lever, a button, etc.) that allows the vehicle occupant to input settings such as activating or deactivating the image capturing device 125, the one or more sensors 126, and/or the like. In some embodiments, a button or other electrically coupled input device may be communicatively coupled to the object tracking system 100 (FIG. 1) such that when the button or other input device is activated (i.e., touched, moved, etc.), the one or more processing devices 604 execute logic stored on the memory component 612 to activate the object tracking system 100 (FIG. 1). It should be appreciated that the input device may be a keyboard, a mouse, a joystick, a touch screen, a remote control, a pointing device, a video input device, an audio input device, a haptic feedback device, and/or the like.

The network interface hardware 620 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 620 may provide a communications link between the vehicle 110 and the other components of the object tracking system 100 depicted in FIG. 1, including (but not limited to) the server computing device 115.

Still referring to FIG. 6A, the data storage device 616, which may generally be a storage medium, may contain one or more data repositories for storing data that is received and/or generated. The data storage device 616 may be any physical storage medium, including, but not limited to, a hard disk drive (HDD), memory, removable storage, and/or the like. While the data storage device 616 is depicted as a local device, it should be understood that the data storage device 616 may be a remote storage device, such as, for example, a server computing device or the like (e.g., the server computing device 115 of FIG. 1). Illustrative data that may be contained within the data storage device 616 is described below with respect to FIG. 6C. It should be appreciated that the amount of available storage space in the data storage device 616 may be limited due to its location in the vehicle component 600 in some embodiments. As such, it may be necessary to minimize the size of the data stored thereon, as described in greater detail herein.

Still referring to FIG. 6A, the I/O hardware 608 may communicate information between the local interface 618 and one or more other components of the vehicle 110. For example, the I/O hardware 608 may act as an interface between the vehicle component 600 and other components, such as navigation systems, meter units, mobile phone systems, infotainment systems, and/or the like. In some embodiments, the I/O hardware 608 may be utilized to transmit one or more commands to the other components of the vehicle 110.

The system interface 614 may generally provide the vehicle component 600 with an ability to interface with one or more external devices such as, for example, the user computing device 120 and/or the server computing device 115 depicted in FIG. 1. Communication with external devices may occur using various communication ports (not shown). An illustrative communication port may be attached to a communications network.

Still referring to FIG. 6A, the image capturing device 125 may be communicatively coupled to the local interface 618 and coupled to the one or more processing devices 604 via the local interface 618. The image capturing device 125 may be any imaging device, sensor, or detector that is suitable for obtaining images. As used herein, the term "images" or "image" refers to video images (i.e., a sequence of consecutive images), still images (including still images isolated from video images), and/or image data.

The one or more sensors 126 may be communicatively coupled to the local interface 618 and coupled to the one or more processing devices 604 via the local interface 618. The one or more sensors 126 may be any imaging device, sensor, or detector that is suitable for obtaining images and/or gathering information/data in the environment 130 surrounding the vehicle 110.

Figure 6B:
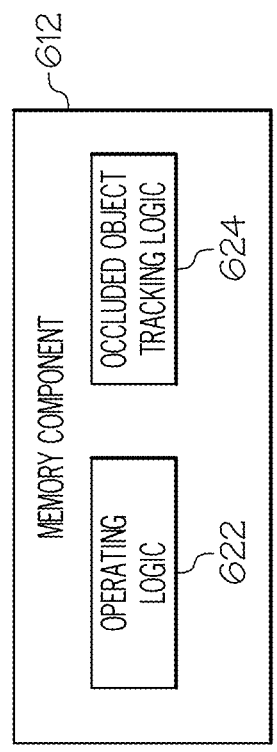
FIG. 6B schematically depicts an illustrative memory component containing illustrative logic components according to one or more embodiments shown and described herein.

With reference to FIG. 6B, in some embodiments, the program instructions contained on the memory component 612 may be embodied as a plurality of software modules, where each module provides programming instructions for completing one or more tasks. For example, FIG. 6B schematically depicts the memory component 612 containing illustrative logic components according to one or more embodiments shown and described herein. As shown in FIG. 6B, the memory component 612 may be configured to store various processing logic, such as, for example, operating logic 622 and occluded object tracking logic 624 (each of which may be embodied as a computer program, firmware, or hardware, as an example). The operating logic 622 may include an operating system and/or other software for managing components of the vehicle component 600 (FIG. 6A). Further, the operating logic 622 may contain one or more software modules for transmitting data, and/or analyzing data.

Still referring to FIG. 6B, the occluded object tracking logic 624 may contain one or more software modules for collecting data from one or more sources (e.g. the image capturing device 125, the one or more sensors 126, the server computing device 115 depicted in FIG. 1, and/or the like) and/or converting data, as described in greater detail herein. Moreover, the occluded object tracking logic 624 may generate the object tracking model 300 (FIG. 4) using feature maps, encoders, sequencers, ConvGRU, neural networks, spatio-temporal graphs, and sub-networks 320a, 320b, and 330c to produce predictions for the current frame.

The occluded object tracking logic 624 may reside on different computing devices. As an example, one or more of the functionalities and/or components described herein may be provided by the user computing device 120 and/or the server computing device 115, which may be coupled to the memory component 612 via the computer network 105, such that access to the occluded object tracking logic 624 may be provided. For example, the one or more processing devices 604 (FIG. 6A) may access the occluded object tracking logic 624 to communicate and retrieve model data and then use the server computing device 115 and/or the like to determine the trajectory following the processes described herein with respect to FIGS. 4 and 7-8.

Figure 6C:
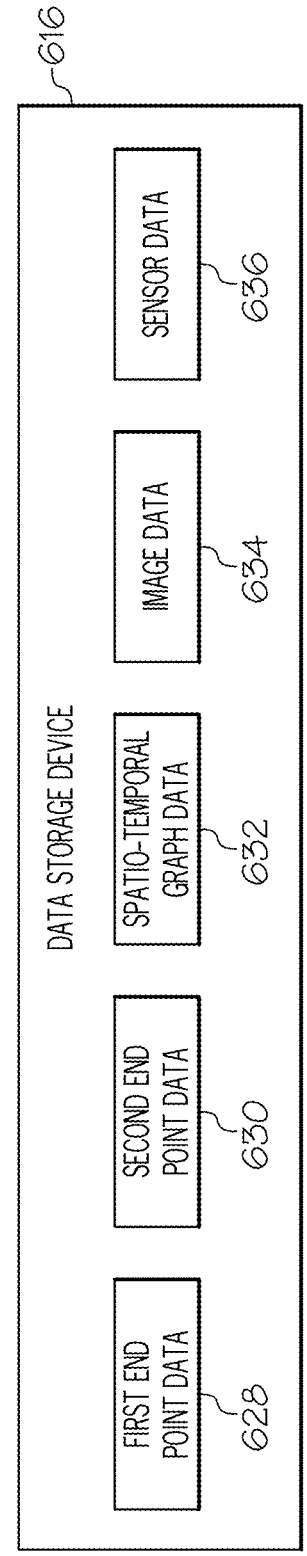
FIG. 6C schematically depicts an illustrative data storage device containing illustrative data components according to one or more embodiments shown and described herein.

FIG. 6C schematically depicts a block diagram of various data contained within a storage device (e.g., the data storage device 616). As shown in FIG. 6C, the data storage device 616 may include, for example, a first end point data 628, and a second end point data 630, such as data which has been processed using the various methods described herein. Moreover, it should be understood that the first end point data 628 and the second end point data 630 may be vehicle gathered data (real) or an engineering data (synthetic). The first end point data 628 and the second end point data 630 may be received, for example, from the server computing device 115 (FIG. 1) or received from, for example, other methods such as the image capturing device 125 or the one or more sensors 126 (FIG. 1). It should be appreciated that the first end point data 628 and the second end point data 630 may not be stored permanently, but instead may be stored temporarily such that the data may be extracted therefrom.

The data storage device 616 may further include, for example, a spatio-temporal graph data 632, which may include data directed to the target object selection, the current position or location of the target object, a trajectory estimation of the target object, the most likely path of travel, and/or the like. The data storage device 616 may further include, for example, an image data 634, which may include a plurality of images of objects and/or data of objects, as discussed in greater detail herein. In addition, the image data 634 may be received from the image capturing device 125, the one or more sensors 126 (FIG. 1), and/or the server computing device 115 (FIG. 1). The data storage device 616 further includes a sensor data 636, which may include a plurality of data images of objects and/or data of objects gathered from the one or more sensors 126 and/or the server computing device 115 (FIG. 1).

It should be understood that the components illustrated in FIGS. 6A-6C are merely illustrative and are not intended to limit the scope of this disclosure. More specifically, while the components in FIGS. 6A-6C are illustrated as residing within the vehicle component 600 of the vehicle 110, this is a non-limiting example. In some embodiments, one or more of the components may reside external to the vehicle component 600 and/or the vehicle 110. Similarly, as previously described herein, while FIGS. 6A-6C are directed to the vehicle component 600 of the vehicle 110, other components such as the user computing device 120 and the server computing device 115 (FIG. 1) may include similar hardware, software, and/or firmware.

As mentioned above, the various components described with respect to FIGS. 6A-6C may be used to carry out one or more processes and/or produce data that can be completed by less powerful processors and/or processors that require fewer resources, such as, for example, vehicle-based computing devices.

Figure 7:
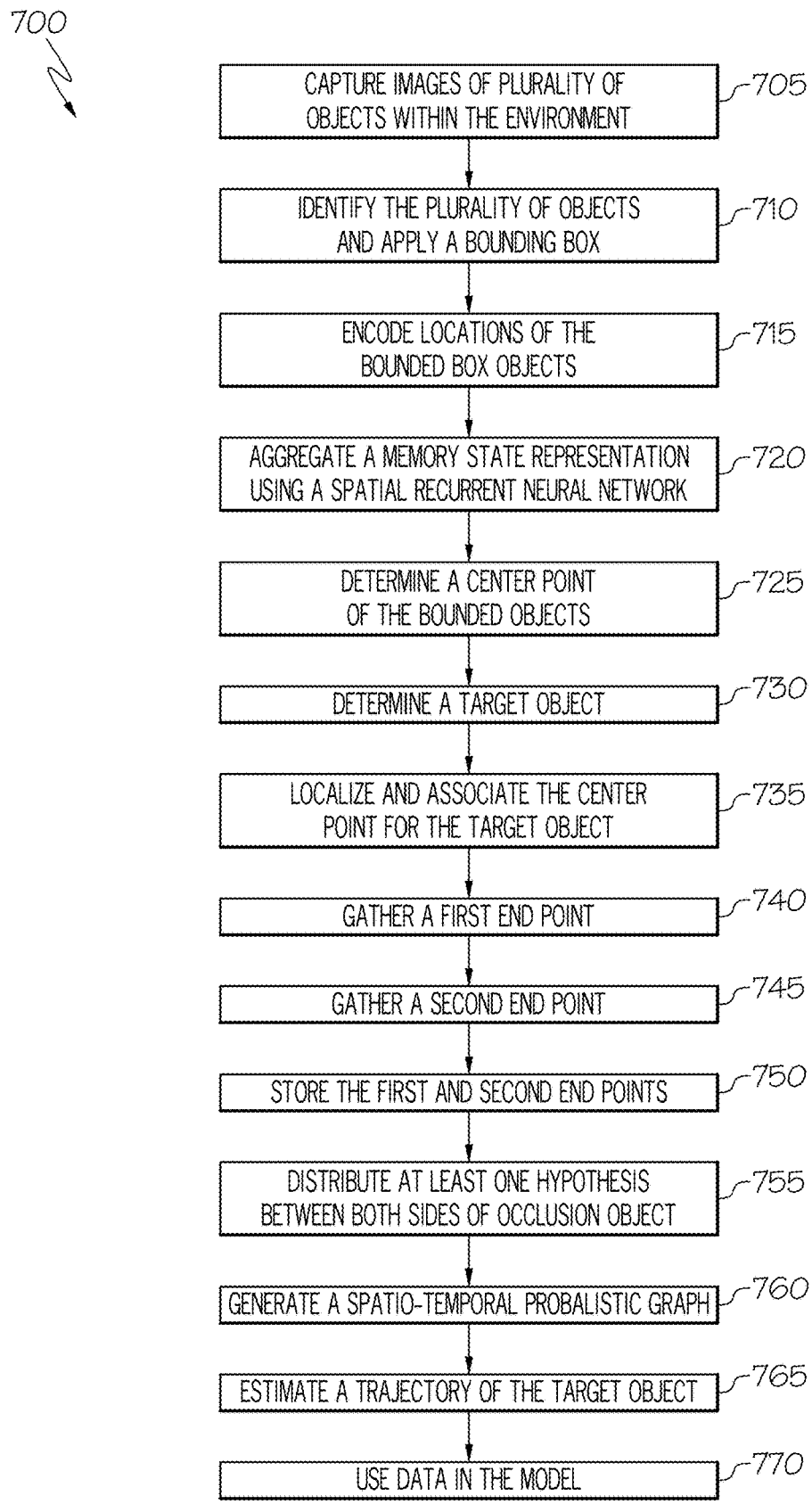
FIG. 7 depicts a flow diagram of an illustrative method of tracking occluded objects performed by the object tracking system at a training time of FIG. 1 according to one or more embodiments shown and described herein.

Referring back to FIGS. 1-4 and now also to FIG. 7, a flow diagram that graphically depicts an illustrative method 700 for tracking occluded objects performed by the object tracking system 100 at a training time to train the model is schematically depicted. Although the steps associated with the blocks of FIG. 7 will be described as being separate tasks, in other embodiments, the blocks may be combined or omitted. Further, while the steps associated with the blocks of FIG. 7 will described as being performed in a particular order, in other embodiments, the steps may be performed in a different order.

At block 705, images of the environment 130 that includes a plurality of objects is captured. The images may be captured via the image capturing device 125, the one or more sensors 126, a combination thereof, and/or the like.

At block 710, one or more processing devices 604 may identify the plurality of objects within the environment 130 and apply a bounding box 160 to the visible objects of the plurality of objects within the environment 130. The one or more processing devices 604 may encode locations of the plurality of objects in the environment 130 captured in a current frame of a sequence of frames $\{I^1, I^2, \ldots, I^n\}$, such as the sequence of frames 200a, 200b, 200c described with reference to FIG. 3, at block 715. As such, the sequence of frames may be a plurality of consecutive frames. In some embodiments, the locations of the plurality of objects may be each encoded in the feature maps 306 for each respective frame of the sequence of frames. In some embodiments the feature maps 306 are down-sampled feature maps. That is, the location of the visible objects of the plurality of objects may be encoded in a corresponding frame. The feature map 306 may be an example of a feature map generated from a convolutional neural network via the backbone network 304, which may be modeled based on the center-tracking model.

At block 720, in some embodiments, the one or more processing devices 604 aggregate a memory state representation that encodes both visible and invisible objects of the plurality of objects in the environment 130 using a spatial recurrent neural network. As such, a sequence model may be used utilizing the spatial recurrent neural network, such as those discussed above with respect to the ConvGRU 308. However, this is non-limiting and in other embodiments, set encoders with global self-attention may be used.

At block, 725, a center point of the bounded objects may be determined. That is, the visible objects of the plurality of objects within the environment 130 may be bounded by the bounding box 160 and the center point may be determined. At block 730, the one or more processing devices 604 may determine a target object 202 from the plurality of objects. The target object 202 may be an object that will be occluded or has already been occluded by an occlusion object of the plurality of objects.

At block 735, the object tracking model 300 is coordinated and trained to localize and associate the center point inside the memory state representation for the target object 202. To localize occluded objects, a random walk is initialized originating from a visible object center. As such, while the target object is visible, the state of the target object is supervised directly. During occlusions, the target object 202 is free to take any path in the graph as long as it terminates at the object center at the time of disocclusion.

At block 740, a first end point corresponding to a position of the target object before occlusion behind an occlusion object in the current frame is determined by the one or more processing devices 604 and, at block 745, a second end point corresponding to a position of the target object after emerging from the occlusion object from another subsequent frame of the sequence of frames is determined by the one or more processing devices 604. The first end point and the second end point are stored, at block 750, for future target objects that are occluded by the same object. For example, the first end point and the second end point may be stored in the data storage device 616.

At block 755, at least one hypothesis between both sides of the occlusion object during occlusion from a subsequent frame of the sequence of frames is distributed. The at least one hypothesis is formed from inferences using a spatio-temporal probabilistic graph, at block 760, that is generated at a training time based on the current frame and the subsequent frames of the sequence of frames by the one or more processing devices 604. The at least one hypothesis is to hypothesize the object location when occluded by the occlusion object and may be implicitly supervised. Further, the at least one hypothesis is used to determine a trajectory, or most likely path of the target object 202, when occluded by the occlusion object and thus not visible to the system. Further details about generating a spatio-temporal probabilistic graph, at block 760, is described herein with respect to FIG. 8.

At block 765, using the at least one distributed hypothesis defined from the generated spatio-temporal probabilistic graph, a trajectory of the target object when occluded is estimated. Further, it is now possible to determine the actual position of the target object during the occlusion and other parameters such as route or path, velocity, and/or the like. At block 770, the trajectory of the target object when occluded is used in the object tracking model 300 as learning data for future target objects that are occluded by the occlusion object Referring back to FIGS. 2-4 and now also to FIG. 8, a flow diagram that graphically depicts an illustrative method 800 for generating a spatio-temporal probabilistic graph and forming a distributed hypothesis on a likely path of the target object during occlusion is schematically depicted. Although the steps associated with the blocks of FIG. 8 will be described as being separate tasks, in other embodiments, the blocks may be combined or omitted. Further, while the steps associated with the blocks of FIG. 8 will described as being performed in a particular order, in other embodiments, the steps may be performed in a different order.

At block 760, the spatio-temporal probabilistic graph is generated. The spatio-temporal probabilistic graph is generated over an evolving spatial memory by comparing the location of the plurality of objects in the current frame with the stored location of each object center of the plurality of objects for each respective prior representation, at block 805. At block 810, a plurality of pixels of the captured images or video of the current frame and the subsequent consecutive frames of the sequence of frames that share an edge as a plurality of nodes are assigned, at block 810. At block 815, a strength of the edge is determined. The strength of the edge may be determined by a similarity of the embedded data connecting the plurality of nodes when the target object occluded by the occlusion object. A transition probability of the at least one node of the plurality of nodes is determined based on more than similarity of instantaneous appearance, as is known in conventional systems. At block 820 a plurality of probabilities is shifted towards paths which are likely to result in correctly localizing the target object when the target object is not occluded by the occluded object. At block 825, the model is guided based on the strength of the edge to the likely path of the target object. At block 830, the object center of the plurality of objects is associated based on centers in the consecutive frames and, at block 835, the system attempts to match the center point of the objects that have the bounding box 160 in the consecutive frames.

A determination is made, at block 840, whether a match is found. If a match is found (yes), then the random walk along memory (RAM) is terminated at block 845. If a match is not found (no), then, at block 850, the random walk along memory continues and the method 800 repeats or loops between blocks 805-850, until a match is found in block 840.

It should now be understood that the methods, systems, and vehicle components described herein may function to track objects behind an occlusion without making assumptions about the velocity of the object behind the occlusion. The methods include tracking an object at training time based on two endpoints for the object passing behind an occlusion. The first endpoint point is the last known position of the object before it is occluded and the second endpoint is the first known position of the object after it is no longer occluded. A model then discovers the most likely hypothesis for connecting the two endpoints by itself. In particular, the model builds a spatio-temporal random graph between the first endpoint and the second endpoint and learns the most likely path of the object behind the occlusion that connects the two endpoints. As such, at inference time, the model requires only the first end point. The methods and system described herein provide a more robust real-world applications than those in conventional object tracing systems.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for tracking occluded objects performed by an object tracking system, the method comprising:
receiving a sequence of frames;
generating a plurality of feature maps for the sequence of fames, each feature map of the plurality of feature maps corresponding to a frame of the sequence of frames;
encoding locations of a plurality of objects in an environment captured in a current frame of the sequence of frames in a respective feature map of the plurality of feature maps for the corresponding frame;
determining a target object of the plurality of objects;
receiving a first end point corresponding to a position of the target object before occlusion behind an occlusion object in the current frame;
distributing a hypothesis between both sides of the occlusion object during occlusion from a subsequent frame of the sequence of frames;
receiving a second end point corresponding to a position of the target object after emerging from the occlusion object from another subsequent frame of the sequence of frames; and
determining a trajectory of the target object within a model when occluded by the occlusion object by performing inferences using a spatio-temporal probabilistic graph based on the current frame and the subsequent frames of the sequence of frames,
wherein the trajectory of the target object when occluded is used as a learning model for future target objects that are occluded by the occlusion object, the learning model is a model trained for the future target objects that are occluded by the same occlusion object as a visual representation in the model that stores permanent object-centric information in a spatially-grounded manner.

2. The method of claim 1, further comprising:
aggregating a memory state representation that encodes both visible and invisible objects of the plurality of objects in the environment using a spatial recurrent neural network.

3. The method of claim 2, further comprising:
applying a bounding box to the target object and to visible objects of the plurality of objects within the environment;
determining a center point of the target object and to the visible objects of the plurality of objects within the environment; and
coordinating and training the learning model to localize and associate the center point inside the memory state representation.

4. The method of claim 3, wherein determining the trajectory of the target object when occluded by performing inferences using the spatio-temporal probabilistic graph based on the current frame and the subsequent frames of the sequence of frames comprises:
comparing the encoded locations of the plurality of objects in the current frame with the stored location of each object center of the plurality of objects for each respective prior representation;
assigning a plurality of pixels of the current frame and subsequent consecutive frames of the sequence of frames that share an edge as a plurality of nodes;
determining a strength of the edge by a similarity of embedding of the plurality of nodes when the target object occluded by the occlusion object such that a transition probability is determined;
shifting a plurality of probabilities towards paths which are likely to result in correctly localizing the target object when the target object is not occluded by objects;
guiding the model based on the strength of the edge to a likely path of the target object;
associating the object center of the plurality of objects based on centers in consecutive frames of the sequence of frames; and
matching the center point of the objects that have the bounding box in the consecutive frames.

5. The method of claim 1, wherein the current frame occurs before the subsequent frame of the sequence of frames.

6. The method of claim 5, further comprising:
capturing the sequence of frames via one or more sensors, wherein the sequence of frames comprises a plurality of consecutive frames.

7. The method of claim 5, wherein the sequence of frames are images captured by an image capturing device that is dynamic in movement.

8. The method of claim 1, wherein the performing of inferences using the spatio-temporal probabilistic graph is at a training time.

9. The method of claim 1, further comprising:
storing the first end point and the second end point for future target objects that are occluded by the same object.

10. The method of claim 1, further comprising training the object tracking system with a combination of synthetic data and real data.

11. An object tracking system comprising:
an image capturing device configured to capture a plurality of objects in an environment in a sequence of frames;
one or more processing devices communicatively coupled to the image capturing device;
one or more memory modules communicatively coupled to the one or more processing devices; and
machine readable instructions stored in the one or more memory modules that cause the object tracking system to perform at least the following when executed by the one or more processing devices:
generate a plurality of feature maps for the sequence of fames, each feature map of the plurality of feature maps corresponding to a frame of the sequence of frames;
encode locations of the plurality of objects in the environment captured in a current frame of the sequence of frames in a respective feature map of the plurality of feature maps for the corresponding frame;
determine a target object of the plurality of objects;
receive a first end point corresponding to a position of the target object before occlusion behind an occlusion object in the current frame;
distribute a hypothesis between both sides of the occlusion object during occlusion from a subsequent frame of the sequence of frames;
receive a second end point corresponding to a position of the target object after emerging from the occlusion object from another subsequent frame of the sequence of frames; and
determine a trajectory of the target object within a model when occluded by the occlusion object by performing inferences using a spatio-temporal probabilistic graph at a training time based on the current frame and subsequent frames of the sequence of frames,
wherein the trajectory of the target object when occluded is used as a learning model for future target objects that are occluded by the occlusion object, the learning model is a model trained for the future target objects that are occluded by the same occlusion object as a visual representation in the model that stores permanent object-centric information in a spatially-grounded manner.

12. The object tracking system of claim 11, wherein the machine readable instructions stored in the one or more memory modules that cause the object tracking system to further perform at least the following when executed by the one or more processing devices:
- aggregate a memory state representation that encodes both visible and invisible objects of the plurality of objects in the environment using a spatial recurrent neural network.

13. The object tracking system of claim 12, wherein the machine readable instructions stored in the one or more memory modules that cause the object tracking system to further perform at least the following when executed by the one or more processing devices:
- apply a bounding box to the target object and to visible objects of the plurality of objects within the environment;
- determine a center point of the target object and to the visible objects of the plurality of objects within the environment; and
- coordinate and training the learning model to localize the center point inside the memory state representation.

14. The object tracking system of claim 13, wherein the machine readable instructions stored in the one or more memory modules that cause the object tracking system to further perform at least the following when executed by the one or more processing devices:
- compare the encoded locations of the plurality of objects in the current frame with the stored location of each object center of the plurality of objects for each respective prior representation;
- assign a plurality of pixels of the current frame and subsequent consecutive frames of the sequence of frames that share an edge as a plurality of nodes;
- determine a strength of the edge by a similarity of embedding of the plurality of nodes when the target object occluded by the occlusion object such that a transition probability is determined;
- shift a plurality of probabilities towards paths which are likely to result in correctly localizing the target object when the target object is not occluded by objects;
- guiding the model based on the strength of the edge to a likely path of the target object;
- associate the object center of the plurality of objects based on centers in consecutive frames of the sequence of frames; and
- match the center point of the objects that have the bounding box in the consecutive frames.

15. The object tracking system of claim 11, wherein the current frame occurs before the subsequent frame of the sequence of frames.

16. The object tracking system of claim 11, further comprising:
- one or more sensors communicatively coupled to the one or more processing devices,
- wherein the one or more sensors is configured to capture the sequence of frames and wherein the sequence of frames comprises a plurality of consecutive frames.

17. The object tracking system of claim 11, further comprising:
- estimating an actual position of the target object during the occlusion.

18. The object tracking system of claim 11, further comprising:
- storing the first end point and the second end point for future target objects that are occluded by the same object.

19. A vehicle system comprising:
- an image capturing device configured to capture a plurality of objects in an environment in a sequence of frames;
- one or more processing devices communicatively coupled to the image capturing device;
- one or more memory modules communicatively coupled to the one or more processing devices; and
- machine readable instructions stored in the one or more memory modules that cause the vehicle system to perform at least the following when executed by the one or more processing devices:
  - generate a plurality of feature maps for the sequence of fames, each feature map of the plurality of feature maps corresponding to a frame of the sequence of frames;
  - encode locations of the plurality of objects in the environment captured in a current frame of the sequence of frames in a respective feature map of the plurality of feature maps for the corresponding frame;
  - determine a target object of the plurality of objects;
  - receive a first end point corresponding to a position of the target object before occlusion behind an occlusion object in the current frame;
  - distribute a hypothesis between both sides of the occlusion object during occlusion from a subsequent frame of the sequence of frames;
  - receive a second end point corresponding to a position of the target object after emerging from the occlusion object from another subsequent frame of the sequence of frames; and
  - estimate a trajectory of the target object when occluded by the occlusion object by performing inferences using a spatio-temporal probabilistic graph based on the current frame and the subsequent frames of the sequence of frames,
  - wherein the trajectory of the target object when occluded is estimated by determining a likely path of the target object in the spatio-temporal probabilistic graph and is used as a learning model for future target objects that are occluded by the occlusion object, the learning model is a model trained for the future target objects that are occluded by the same occlusion object as a visual representation in the model that stores permanent object-centric information in a spatially-grounded manner.

20. The vehicle system of claim 19, wherein the performing of inferences using the spatio-temporal probabilistic graph is at a training time.

* * * * *

UNITED STATES PATENT AND TRADEMARK OFFICE
CERTIFICATE OF CORRECTION

PATENT NO. : 12,236,688 B2  
APPLICATION NO. : 17/738678  
DATED : February 25, 2025  
INVENTOR(S) : Pavel Tokmakov, Allan Jabri and Adrien D. Gaidon Page 1 of 2

It is certified that error appears in the above-identified patent and that said Letters Patent is hereby corrected as shown below:

On the Title Page

Item (73), assignee 3, city, delete "Toyota (JP)" and insert --Toyota-shi Aichi-ken (JP)--, therefor.

In the Drawings

In drawing sheet 9 of 10, figure 7, block 760, delete "PROBALISTIC" and insert --PROBABILISTIC--, therefor.

Figure 8:
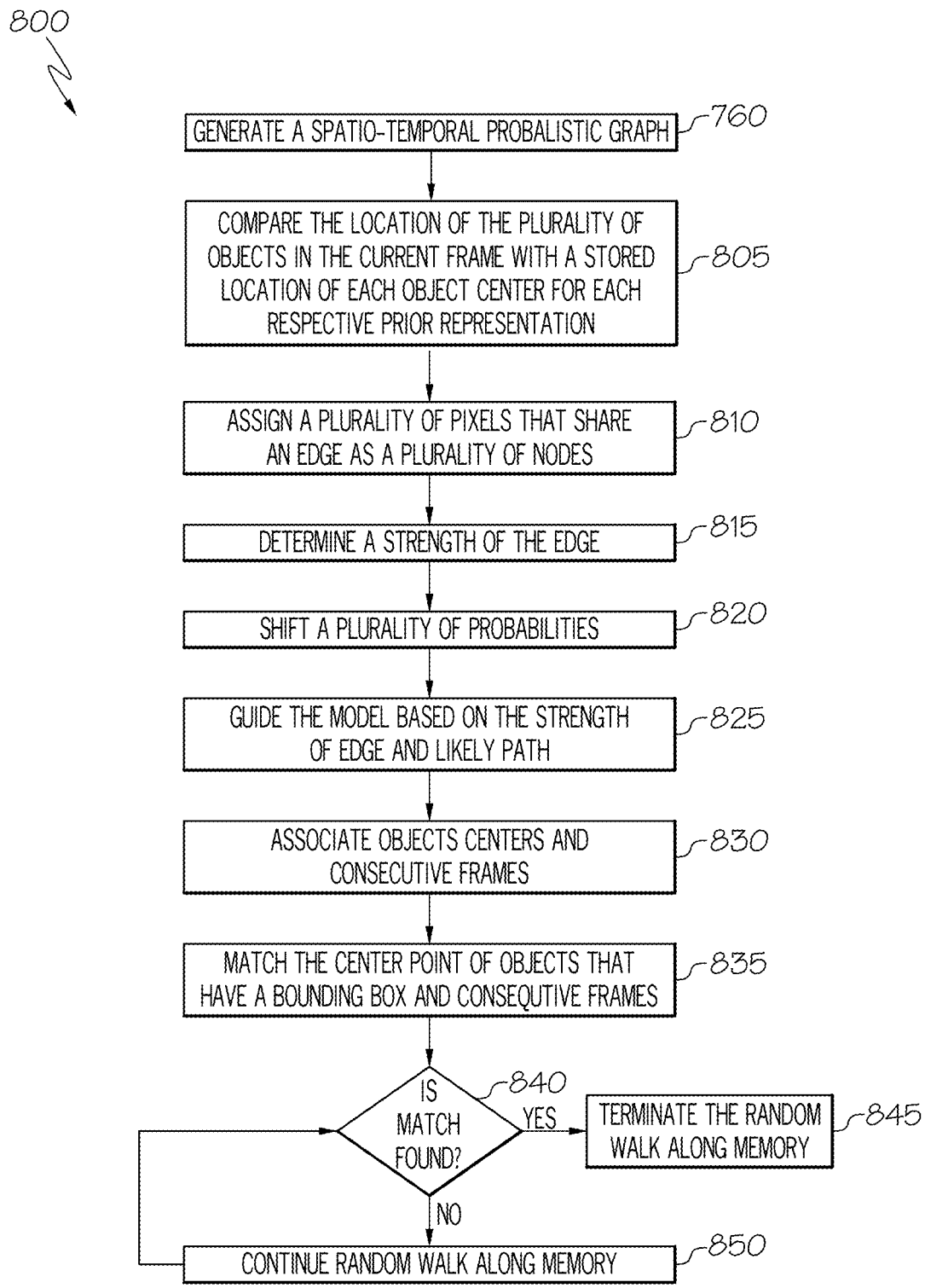
FIG. 8 depicts a flow diagram of an illustrative method of generating a spatio-temporal probabilistic graph and forming a distributed hypothesis on a likely path of a target object during occlusion according to one or more embodiments shown and described herein.

In drawing sheet 10 of 10, figure 8, block 760, delete "PROBALISTIC" and insert --PROBABILISTIC--, therefor.

In the Specification

In Column 3, Line(s) 13, delete "graphically" and insert --graphical--, therefor.

In Column 3, Line(s) 17, delete "graphically" and insert --graphical--, therefor.

In Column 9, Line(s) 30, after "converted", delete "to".

In Column 10, Line(s) 25, after "memory", delete "Mt" and insert --M$^t$--, therefor.

In Column 10, Line(s) 38, delete "330c" and insert --320c--, therefor.

In Column 13, Line(s) 5, after "objects", delete "wo" and insert --who--, therefor.

In Column 15, Line(s) 23, delete "330c" and insert --320c--, therefor.

In Column 16, Line(s) 30, after "will", insert --be--.

Signed and Sealed this  
Twenty-second Day of April, 2025

Coke Morgan Stewart  
*Acting Director of the United States Patent and Trademark Office*

In Column 17, Line(s) 62, after "will", insert --be--.

In the Claim

In Column 18, Line(s) 64, Claim 1, delete "fames" and insert --frames--, therefor.

In Column 20, Line(s) 35, Claim 11, delete "fames" and insert --frames--, therefor.

In Column 22, Line(s) 22, Claim 19, delete "fames" and insert --frames--, therefor.